United States Patent
Powers et al.

(10) Patent No.: US 11,704,350 B2
(45) Date of Patent: Jul. 18, 2023

(54) SEARCH TERM EXTRACTION AND OPTIMIZATION FROM NATURAL LANGUAGE TEXT FILES

(71) Applicant: LiveRamp, Inc., San Francisco, CA (US)

(72) Inventors: Chivon Powers, Burlingame, CA (US); Tzung-Han Lai, Larkspur, CA (US); Michael Anderson, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 441 days.

(21) Appl. No.: 16/650,710

(22) PCT Filed: Oct. 4, 2018

(86) PCT No.: PCT/US2018/054331
§ 371 (c)(1),
(2) Date: Mar. 25, 2020

(87) PCT Pub. No.: WO2019/070954
PCT Pub. Date: Apr. 11, 2019

(65) Prior Publication Data
US 2020/0285972 A1    Sep. 10, 2020

Related U.S. Application Data

(60) Provisional application No. 62/568,374, filed on Oct. 5, 2017.

(51) Int. Cl.
*G06F 16/33*  (2019.01)
*G06N 20/00*  (2019.01)
(Continued)

(52) U.S. Cl.
CPC .... *G06F 16/3344* (2019.01); *G06F 16/24578* (2019.01); *G06N 5/04* (2013.01); *G06N 20/00* (2019.01)

(58) Field of Classification Search
CPC .................................................. G06F 16/3344
See application file for complete search history.

(56) References Cited

U.S. PATENT DOCUMENTS 5,265,065 A * 11/1993 Turtle ................. G06F 16/3335
707/999.005
7,634,467 B2   12/2009 Ryan et al.
(Continued)

OTHER PUBLICATIONS

Andrade, "Enterprise Reference Lexicon Building from Business Models," run.unl.pt/bitstream/10362/14256/1/Andrade_2014.pdf (Sep. 2014).

(Continued)

*Primary Examiner* — Van H Oberly

(57) ABSTRACT

A system and method for extracting search terms for corresponding data elements from a natural language document identifies meaningful words within the context; identifies and structures the keywords; expounds on the keywords to optimize the search results; and captures the most relevant data elements from the corresponding database. Predetermined demographic characteristics and short (one- or two-word) search phrases that capture descriptors of behavioral characteristics are structured in the process. The result of the completed process yields a parameter set naming demographic and behavioral characteristics along with a structure that is optimized for search within a database comprising a large number of data elements.

15 Claims, 2 Drawing Sheets

(51) Int. Cl.
*G06F 16/2457* (2019.01)
*G06N 5/04* (2023.01)

(56) References Cited

U.S. PATENT DOCUMENTS

| | | | |
|---|---|---|---|
| 8,380,745 B1 | 2/2013 | Nayfeh | |
| 9,020,840 B2 | 4/2015 | Akolkar et al. | |
| 2015/0199436 A1* | 7/2015 | Bailey | G06F 16/9535 |
| | | | 707/708 |
| 2016/0140619 A1 | 5/2016 | Soni et al. | |
| 2016/0147760 A1 | 5/2016 | N et al. | |
| 2016/0171088 A1* | 6/2016 | Johnson | G06F 16/3329 |
| | | | 707/739 |

OTHER PUBLICATIONS

Wedel et al., "Marketing Analytics for Data-Rich Environments," rhsmith.umd.edu/files/Documents/Departments/kannan-jm-2016-final.pdf (Nov. 30, 2016).

* cited by examiner

SEARCH TERM EXTRACTION AND OPTIMIZATION FROM NATURAL LANGUAGE TEXT FILES

TECHNICAL FIELD

The field of the invention is analyzing natural language text files for extraction and structuring of meaningful search terms.

BACKGROUND ART

Extremely large databases, such as may be used for marketing purpose, are being aggregated at an increasingly rapid pace. These databases are becoming progressively more complex as a result. Such databases may contain thousands of categories of data (i.e., data segments) each concerning hundreds of millions of individuals, households, or other entities that are tracked in the database. These databases are becoming so large and complex in fact that they are expanding beyond the capability of human search and recall capabilities to effectively utilize them. This is because a human curator of such a database is inherently limited to his or her own set of interpretive heuristics which, however intuitive they may be, can never be so comprehensive as to take into account the full richness of such complex databases. In addition, the slow speed at which human curators are able to formulate appropriate searches, combined with the rapidly increasing number of searches that much be completed and the rapid turnaround necessary for the results to be relevant in a constantly evolving, dynamic marketing environment, means that human searches are simply no longer practical because they cannot be completed in a timeframe in which the results will still be relevant.

Marketing databases such as described above are used by data buyers, who seek to purchase data from the marketing database provider for the purpose of directing a marketing message to a particular targeted audience. For example, if the data buyer is a provider of a weight loss service, the data buyer may be interested in identifying an audience of persons who seek to lose weight. Data buyers thus are typically interested in exploring audience segment offerings that are related to specific marketing campaign audience criteria. These criteria are generally listed, in natural-language format, in a request for proposal (RFP) document prepared by the data buyer. The RFP will include terms describing behavior (including buying patterns or "propensities") that are desired in a particular audience for the data buyer's marketing message, and outline specifications such as age, gender, income, and other demographic requirements of the desired audience.

Because the data buyer is working from an RFP or other natural-language document that sets out the desired audience characteristics, data buyers are required to somehow translate their own natural-language descriptions of a desired target audience into search terms. Two alternatives exist today. First, the data buyer can act for him- or herself to transform the RFP into SQL queries to search the desired marketing database. The other alternative is for the data buyer to send the request to human curators whose task is to then find relevant data segments based on the data buyer's descriptions. Either way, the accuracy of the result depends upon the ability of a human to recall a massive number of constantly evolving data segments and identify the optimal ones for this particular RFP. The inevitable human error means that data buyers are receiving sub-optimal audience results, given the available data in the marketing database that could be used to target the marketing message. In addition, the human element adds greatly to the cost of the process (particularly when a separate human curator is employed). Finally, this also means that the turnaround time for the overall process is highly variable, typically taking hours or days depending on the human curators' familiarity with the database, whether the data is housed in one or more databases, and if there are special permissions associated with the data to be returned. As noted above, this turnaround time has now rendered human-curated searches impractical, because targeted messages must be constructed quickly to be meaningful as the data is constantly evolving and being updated and expanded in the fast-moving, Internet-based marketing environment of today. What is desired then is a faster and more accurate method of translating an RFP or other natural-language document or text identifying a target audience into a request identifying optimal data elements to be searched in a marketing database, where the improved method leads to optimal results from the marketing database and also provides a sufficiently quick turnaround time such that the results are commercially meaningful and actionable.

References mentioned in this background section are not admitted to be prior art with respect to the present invention.

SUMMARY OF THE INVENTION

The present invention is directed to a system and method for extracting search terms for corresponding data elements from a natural language description of a desired audience, such as might be found in an RFP from a data buyer. In certain implementations, the invention is directed to a system that identifies particularly meaningful words within the context of a written (or potentially verbal) data order; identifies and structures the keywords; expounds on the keywords to optimize the search results; and captures the most relevant data elements from the marketing database. The system uses transformations to structure the natural language input and generate from it the optimal search terms for the desired data elements. Two general types of information are structured in this process: pre-determined demographic characteristics, and short (one- or two-word) search phrases that capture descriptors of behavioral characteristics. Pre-determined demographic characteristics may include, for example, age, income, gender, and geographic location. The behavioral characteristics may include, for example, a propensity for buying certain categories of products or services. The completed process yields a parameter set naming demographic and behavioral characteristics along with a structure that is optimized for search within a database comprising a large number of data elements.

The invention, in various implementations, may be utilized in a stand-alone fashion to create an optimized search from a document such as an RFP, or may be used as an add-on process to improve results derived from the typical search process whereby a data buyer enters search terms directly.

These and other features, objects and advantages of the present invention will become better understood from a consideration of the following detailed description of the preferred embodiments and appended claims in conjunction with the drawings as described following:

DESCRIPTION OF EMBODIMENTS

The present invention will be described below with reference to one or more specific implementations; it is understood, however, that these implementations are not limiting to the invention, and the full scope of the invention is as will be set forth in any claims directed to the invention in this or a subsequent application directed to the invention.

Figure 1:
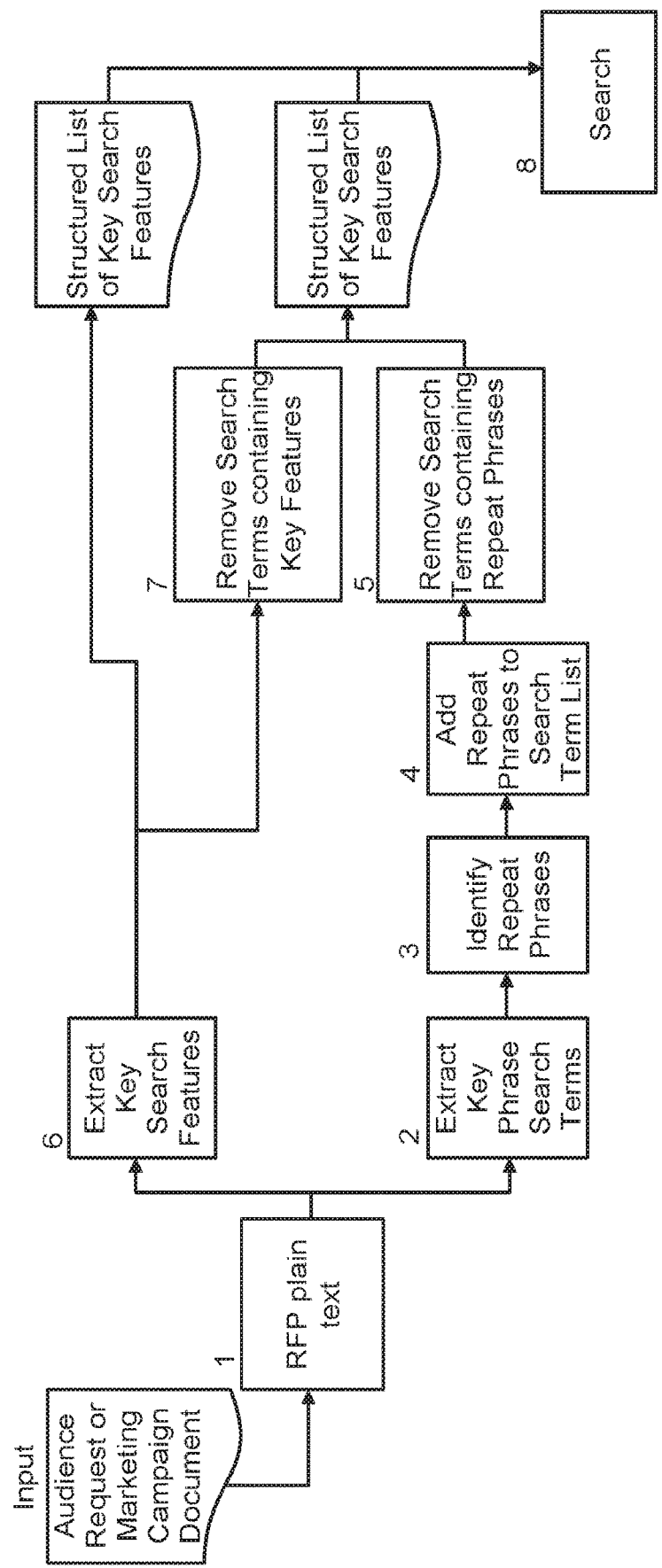
FIG. 1 is a flow diagram illustrating the stages in a request for proposal (RFP) extraction processing according to an implementation of the invention.

Referring now to FIG. 1, the steps in a process for extracting optimized search terms from an RFP may now be described. The input to the process is a set of unstructured natural-language text that is either entered directly through a web-based search interface or uploaded by a user as, for example, a .pdf, .xlsx, .ppt, .doc, or .txt file. If not already in plain text format, the input is converted at step 1 using conversion software that is most suitable for the search system in which the extraction process is embedded. At step 2 the text is then subject to a key-phrase search term extraction process whereby the system applies basic removal of stop words and punctuation-based separation of sentences into clauses. The stop word list is created, in one implementation, by taking the commonly-used Fox stop word list and adding domain-specific words that have been found to be frequently used in audience requests. This step is desirable because words that are highly frequent in data ordering request language are not particularly useful for finding uniquely associated data elements when searching through a database of marketing data elements. The key phrase search term extraction process then yields a list of search terms.

Further processing as shown in FIG. 1 may be described with reference to a particular example. Suppose that the RFP used to begin the process contains a set of text that says, "let me know if you have audiences around the following: weight loss pharmaceuticals, weight loss diet trends, competitive: weight watchers, jenny craig, etc. weight loss purchasers." At step 2, the process would break this text down into a list of search terms such as, "weight loss pharmaceuticals, weight loss diet trends, weight watchers, jenny craig, competitive." The search term list is then inspected for repeated phrases at step 3. Repeat phrases are then added as a new individual search term with highest importance in the search term list. Processing at step 3 would detect that "weight loss" exists within more than one of the search terms on the list, and then step 4 adds "weight loss" as a new search term at the top of the search term list, or uses another method (e.g., ranking) to indicate that this term is highly important. Repeated phrases are then removed from within the search terms at step 5. Using the same example, after step 5 the search term list is: "weight loss, pharmaceuticals, diet trends, Jenny Craig, competitive."

The original plain text input is also subject to key search feature extraction wherein specific patterns, words, and descriptors are detected and structured lists of supplementary search information is derived from them. The key search features are cues in the text that are particularly relevant for sorting, scanning, or otherwise searching through the data being ordered including (but not limited to) demographic callouts (i.e., "women ages 21-34"), geolocation recognition (i.e., "mid-westerner"), and entity recognition (i.e., "Weight Watchers" in the previous example input text). If any of the key search features exist in the text set, they are captured and extracted in step 6 and then, if applicable, terms on the key phrase search term list that are comprised of text collected as a key search feature are removed in step 7. With repeated phrases and key search feature-related terms removed, the key phrase search term list, ordered by importance, is structured for and submitted to the search system along with the structured list of key search features if applicable.

After all of the processing described above is performed, processing then moves to step 8, where the structured list of key search features and structured list of key phrase search terms are fed into the marketing database at step 8 in order to extract the corresponding data elements.

Figure 2:
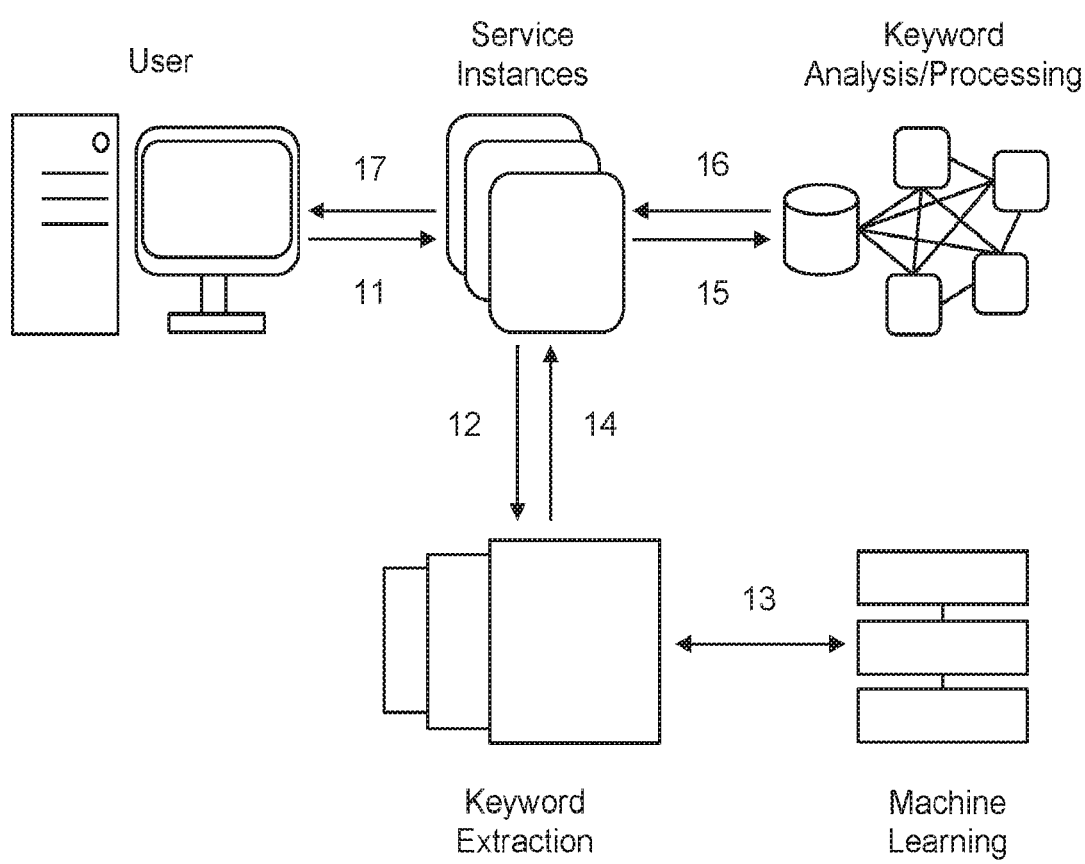
FIG. 2 is a service structure diagram for a system to perform the RFP extraction process of FIG. 1, according to an implementation of the invention.

Turning now to FIG. 2, a flow through a system implemented for carrying out the invention in a particular implementation may be described. At flow 11, the process initiated by a user machine making a request including, for example, text or documentation, to instance services that are the front end service for the client. At flow 12, the process examines the content of the request and, if applicable, utilizes machine learning (ML) systems at flow 13 to identify significant keywords, extract ranges, perform categorical analysis, and any other ML systems included in the service of keyword extraction. After the results of keyword extraction are produced at flow 14, they are subject to keyword analysis at flow 15 to calculate priority, meaning, word relationship, and like properties through the usage of in-memory processing and cache lookups. The analysis is returned to the instance services at flow 16 for the service to provide consistency and summarization of the results before finally returning the data to the client at flow 17.

The invention may, in various implementations, utilize commercial and open-source libraries, tools, and infrastructure to perform its task. The service may utilize an in-memory cache store for word lookups and word meaning extraction. The process may also use an in-memory processing tool or library to calculate word relationships and context for word association and range or mapping relationships. The tools should provide the programming throughput and speed to perform the calculations and analysis. Important components in certain implementations are the fast cache and in-memory processing tools that provide faster throughput for the service.

In alternative implementations, the invention could be changed to detect many additional demographic, psychographic, or any features directly corresponding with information represented in the marketing database. The method in which feature-related information is detected and stored could be altered to include additional functions beyond string pattern and entity recognition. These changes would be implemented as additional processes at step 6 of the extraction process illustrated in FIG. 1. All changes would in certain alternative implementations use commercial and open-source libraries instantiated in the service and data flow depicted in flows 12 through 16 of the service architecture illustrated in FIG. 2. The system could be used to extract target description-related information from any sets of data, not just data used in audience creation. Thus, the actual structure of the result parameter set would be customized to integrate with different search systems and database formats. Such customizations would occur at flow 16 of FIG. 2.

Python code for one implementation of the routine for search term extraction from the audience request language may be as follows. In this example, demographic features searched include gender, income, age, and presence of children. Bigrams (pairs of consecutive words) of interest are identified and then prioritized.

```
def RFPparse(rfpterms, rfp):
    RFPterm_dict = defaultdict(list)
    bigram_dict = defaultdict(list)
    #Create detectors for key search features
    for item, rank in KeywordList[0]:
        rangevalues = re.search(r"(\$?([0-9]{1,})k?\s?(-|to)?\s?\$?([0-9]{1,})k?\+?)",item)
        rangevaluelist = re.findall(r"(\$?([0-9]{1,})k?\s?(-|to)?\s?\$?([0-9]{1,})k?\+?)",item)
        femalesignals = re.findall(r"(\bwom(a|e)n\b|\blad(y|ies)\b|\bgirls\b|\bfemales?\b)",item)
        malesignals = re.findall(r"(\bm(a|e)n|guy\bmales?\b|\bgentlem(a|e)ns?\b|boys?)",item)
        incomesignals = re.findall(r"(\bhhi\b|\bincome\b|\bsalary\b|\bearnings?\b|\$[0-9]{1,}|[0-9]{1,}k|[0-9]{1,}\+)",item)
        agesignals = re.findall(r"(^aged?|\bmonths\b|\byears\sold\b|\byo\b|\byrs\b)",KeywordList[1])
        if rangevalues:
            if incomesignals:
                if re.findall(r"\+|\bmore\b|\babove\b|>",KeywordList[1]):
                    RFPterm_dict['income'].append({'value': None,'start':re.sub('[^0-9]', '', str(incomesignals[0])),'end':None,'score':99.0})
                elif re.findall(r"\bless\b |\bbelow\b|\bunder\b|<",KeywordList[1]):
                    RFPterm_dict['income'].append({'value': None,'start':None,'end':re.sub('[^0-9]', '', str(incomesignals[0])),'score':99.0})
                else:
                    RFPterm_dict['income'].append(({'value': None, 'start': int(rangevalues.group(2)),'end': int(rangevalues.group(4)),'score': 99.0}))
            elif agesignals:
                if re.findall(r"(([0-9]{1,})\s?(-|to)\s?([0-9]{1,})\s(\bmonths?|\bnewborn))",KeywordList[1]):
                    RFPterm_dict['terms'].append(({'term':'infant', 'score': 99.0}))
                    RFPterm_dict['age'].append(({'value': None, 'start': 0,'end': 1,'score':99.0}))
                else:
                    RFPterm_dict['age'].append(({'value': None, 'start': int(rangevalues.group(2)),'end': int(rangevalues.group(4)),'score': 99.0}))
            elif femalesignals:
                RFPterm_dict['gender'].append({'value':'Female','start':None,'end':None,'score':99.0})
            elif malesignals:
                RFPterm_dict['gender'].append({'value':'Male','start':None,'end':None,'score':99.0})
            else:
                RFPterm_dict['terms'].append({'term': item, 'score': rank})
    #Pull out Geolocations
    doc = nlp(rfp)
    for ent in doc.ents:
        if ent.label_ == 'GPE':
            RFPterm_dict['geoLoc'].append((str(ent),99.0))
    for term, rank in RFPterm_dict['terms']:
        term = term.lower( )
        for keyword,score in RFPterm_dict['geoLoc']:
            keyword = keyword.lower( )
            if keyword in term:
                RFPterm_dict['terms'].remove((term,rank))
    #Find and prioritize important bigrams
    keyphrasestring = [str(''.join(item)) for item, rank in KeywordList[0]]
    bilist = getbigrams(str(keyphrasestring))
    if bilist:
        for bigramitem in bilist:
            RFPterm_dict['terms'].append({'term': bigramitem, 'score': 99.0})
    RFPterm_json = json.dumps(RFPterm_dict)
    return(RFPterm_json)
```

Unless otherwise stated, all technical and scientific terms used herein have the same meaning as commonly understood by one of ordinary skill in the art to which this invention belongs. All terms used herein should be interpreted in the broadest possible manner consistent with the context. When a grouping is used herein, all individual members of the group and all combinations and subcombinations possible of the group are intended to be individually included in the disclosure. All references cited herein are hereby incorporated by reference to the extent that there is no inconsistency with the disclosure of this specification. If a range is expressed herein, such range is intended to encompass and disclose all sub-ranges within that range and all particular points within that range.

The present invention has been described with reference to certain preferred and alternative embodiments that are intended to be exemplary only and not limiting to the full scope of the present invention, as set forth in the appended claims.

The invention claimed is:

1. A search term extraction and optimization method, comprising the steps of:

a. receiving, at a service instances server, a request document comprising a natural language request;
b. at a keyword extraction engine, applying one or more of a plurality of machine learning methods to extract key phrase search terms from the request document to create a key phrase search term list;
c. at a keyword analysis/processing engine, identifying any repeat phrases in the key phrase search term list and separately adding the repeat phrases to the key phrase search term list as highest importance key phrases as a new individual highest importance search term, and then deleting the repeat phrases as originally appearing in the key phrase search term list;
d. at the keyword extraction engine, extracting a set of key search features from the request document to produce a key search feature list, wherein the key search features comprise cues in the natural language request relevant to at least one of sorting, scanning, and searching;
e. at the keyword analysis/processing engine, removing key phrase search terms containing key features from the key phrase search term list to produce a structured key phrase search term list; and
f. at the service instances server, searching a database using the key search feature list and structured key phrase search term list to identify matching elements.

2. The method of claim 1, further comprising the step of removing stop words prior to the step of extracting key phrase search terms from the request document.

3. The method of claim 2, wherein the step of adding the repeat phrases to the key phrase search term list as highest importance key phrases comprises the step of adding the repeat phrases at a top of the key phrase search term list.

4. The method of claim 2, wherein the step of adding the repeat phrases to the key phrase search term list as highest importance key phrases comprises the step of ranking the repeat phrases higher than the extracted key phrase search terms in the key phrase search term list.

5. The method of claim 2, wherein the set of key search features comprises one or more of a demographic callout, geolocation recognition, or an entity recognition feature.

6. A computer-readable medium storing instructions that, when executed by a computer, cause it to:
a. receive a request document comprising a natural language request;
b. apply one or more of a plurality of machine learning methods to extract key phrase search terms from the request document to create a key phrase search term list;
c. identify any repeat phrases in the key phrase search term list and separately add the repeat phrases to the key phrase search term list as highest importance key phrases as a new individual highest importance search term, and then delete the repeat phrases as originally appearing in the key phrase search term list;
d. extract a set of key search features from the request document to produce a key search feature list, wherein the key search features comprise cues in the natural language request relevant to at least one of sorting, scanning, and searching;
e. remove key phrase search terms containing key features from the key phrase search term list to produce a structured key phrase search term list; and
f. search a database using the key search feature list and structured key phrase search term list to identify matching elements.

7. The computer-readable medium of claim 6, further comprising stored instructions that, when executed by a computer, cause it to remove stop words prior to the step of extracting key phrase search terms from the request document.

8. The computer-readable medium of claim 7, wherein the instructions to add the repeat phrases to the key phrase search term list as highest importance key phrases comprises instructions to add the repeat phrases at a top of the key phrase search term list.

9. The computer-readable medium of claim 7, wherein the instructions to add the repeat phrases to the key phrase search term list as highest importance key phrases comprises instructions to rank the repeat phrases higher than the extracted key phrase search terms in the key phrase search term list.

10. The computer-readable medium of claim 7, wherein the set of key search features comprises one or more of a demographic callout, geolocation recognition, or an entity recognition feature.

11. A search term extraction and optimization system, comprising:
a. a service instances server, configured to:
  i. receive a request document comprising a natural language request; and
  ii. search a database using a key search feature list and a structured key phrase search term list to identify matching elements;
b. a keyword extraction engine, configured to:
  i. apply one or more of a plurality of machine learning methods to extract key phrase search terms from the request document to create a key phrase search term list; and
  ii. extract a set of key search features from the request document to produce the key search feature list, wherein the key search features comprise cues in the natural language request relevant to at least one of sorting, scanning, and searching; and
c. a keyword analysis/processing engine, configured to:
  i. identify any repeat phrases in the key phrase search term list and separately add the repeat phrases to the key phrase search term list as highest importance key phrases as new individual highest importance search terms, and then delete the repeat phrases as originally appearing in the key phrase search term list; and
  ii. remove key phrase search terms containing key features from the key phrase search term list to produce the structured key phrase search term list.

12. The system of claim 11, wherein the service instances server is further configured to remove stop words from the request document.

13. The system of claim 12, wherein the keyword analysis/processing engine is further configured to add the repeat phrases at a top of the key phrase search term list.

14. The system of claim 12, wherein the keyword analysis/processing engine is further configured to rank the repeat phrases higher than the extracted key phrase search terms in the key phrase search term list.

15. The system of claim 12, wherein the set of key search features comprises one or more of a demographic callout, geolocation recognition, or an entity recognition feature.

* * * * *